(12) United States Patent
Nikkel

(10) Patent No.: US 6,739,199 B1
(45) Date of Patent: May 25, 2004

(54) SUBSTRATE AND METHOD OF FORMING SUBSTRATE FOR MEMS DEVICE WITH STRAIN GAGE

(75) Inventor: Eric Lee Nikkel, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/384,887

(22) Filed: Mar. 10, 2003

(51) Int. Cl.[7] ................................. G01B 7/16
(52) U.S. Cl. ........................... 73/777; 73/782
(58) Field of Search .................. 73/720, 721, 719; 347/19; 438/50

(56) References Cited

U.S. PATENT DOCUMENTS

| | | |
|---|---|---|
| 4,373,399 A | 2/1983 | Beloglazov et al. |
| 4,462,018 A | 7/1984 | Yang et al. |
| 4,576,052 A | 3/1986 | Sugiyama |
| 4,658,233 A | 4/1987 | Uchida et al. |
| 4,737,473 A | 4/1988 | Wilner |
| 4,771,638 A * | 9/1988 | Sugiyama et al. ............ 73/721 |
| 4,793,194 A | 12/1988 | Wilner |
| 4,841,272 A | 6/1989 | Yamagishi et al. |
| 5,275,055 A | 1/1994 | Zook et al. |
| 5,400,489 A | 3/1995 | Hegner et al. |
| 5,408,253 A | 4/1995 | Iddan |
| 5,417,115 A | 5/1995 | Burns |
| 5,511,427 A | 4/1996 | Burns |
| 5,742,222 A | 4/1998 | Young et al. |
| 5,872,315 A | 2/1999 | Nagase et al. |
| 5,946,549 A | 8/1999 | Itoigawa et al. |
| 6,398,329 B1 * | 6/2002 | Boyd et al. ..................... 347/7 |
| 6,412,901 B2 * | 7/2002 | Su et al. ........................ 347/19 |
| 6,615,668 B2 * | 9/2003 | Toyoda et al. ................. 73/720 |
| 6,620,644 B2 * | 9/2003 | Kretschmann et al. ........ 438/50 |

* cited by examiner

*Primary Examiner*—Edward Lefkowitz
*Assistant Examiner*—Takisha Miller

(57) ABSTRACT

A substrate for a MEMS device includes a base material having a first side, a poly silicon strain gage formed on the first side of the base material, a dielectric material disposed over the strain gage, and a conductive material in communication with the strain gage through the dielectric material, wherein the substrate is adapted to have at least one opening formed therethrough, and wherein the strain gage is adapted to be formed adjacent the at least one opening.

33 Claims, 5 Drawing Sheets

SUBSTRATE AND METHOD OF FORMING SUBSTRATE FOR MEMS DEVICE WITH STRAIN GAGE

BACKGROUND OF THE INVENTION

Strain gages have been developed for measuring stresses in structures. Conventional strain gages include metallic foil type strain gages and semiconductor type strain gages. Metallic foil type strain gages typically include a wire having an electrical resistance which varies when subjected to stress. Semiconductor type strain gages typically include a piezoresistive material which varies in resistance when subjected to stress. Use of a conventional strain gage requires that the strain gage be fastened or adhered to the structure being measured for stresses.

Microelectromechanical systems or MEMS devices include micromachined substrates integrated with electronic microcircuits. Such devices may form, for example, microsensors or microactuators which operate based on, for example, electromagnetic, electrostrictive, thermoelectric, piezoelectric, or piezoresistive effects.

Conventional strain gages are often unsuitable for measuring stresses in a MEMS device. For example, conventional strain gages are often larger than the MEMS device itself. In addition, fastening or adhering a conventional strain gage to the MEMS device may actually increase the strength of the MEMS device, thereby reducing stress in the MEMS device and providing an inaccurate measurement of the actual stress in the MEMS device.

Accordingly, there is a need for the present invention.

SUMMARY OF THE INVENTION

A substrate for a MEMS device includes a base material having a first side, a poly silicon strain gage formed on the first side of the base material, a dielectric material disposed over the strain gage, and a conductive material in communication with the strain gage through the dielectric material, wherein the substrate is adapted to have at least one opening formed therethrough, and wherein the strain gage is adapted to be formed adjacent the at least one opening.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
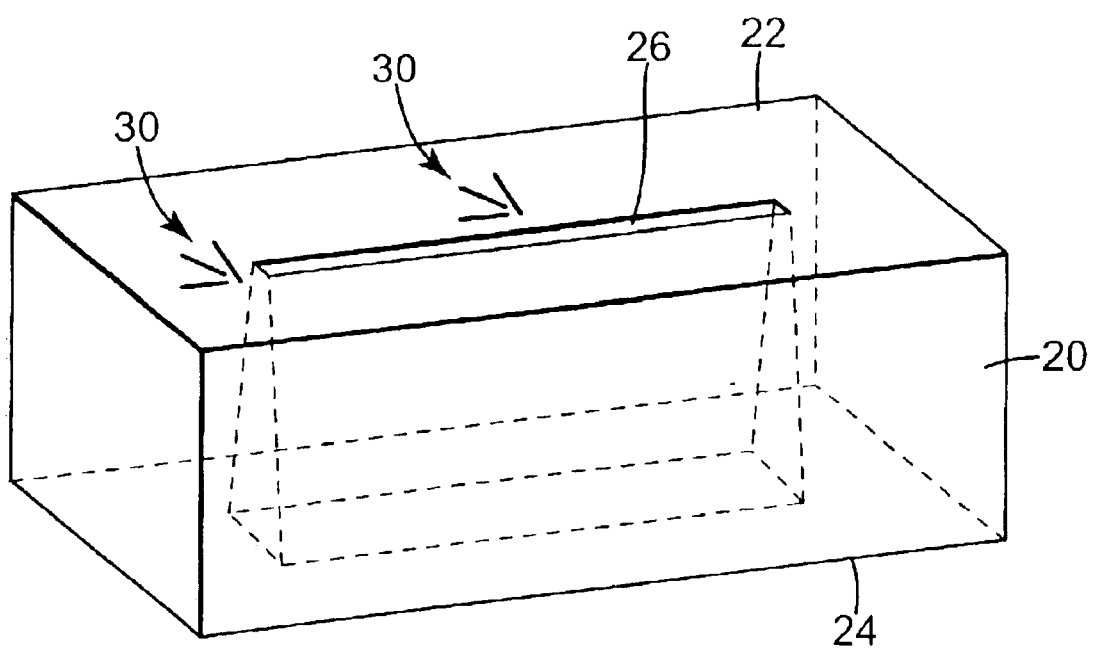
FIG. 1 is a schematic perspective view illustrating one embodiment of a substrate for a MEMS device according to the present invention.

FIG. 1 illustrates one embodiment of a substrate 20 for a microelectromechanical system or MEMS device. The MEMS device may include, for example, a microsensor or a microactuator and may operate based on, for example, electromagnetic, electrostrictive, thermoelectric, piezoelectric, or piezoresistive effects.

In one embodiment, substrate 20 has a first side 22 and a second side 24. Second side 24 is opposite of first side 22 and, in one embodiment, oriented substantially parallel with first side 22. In addition, substrate 20 has an opening 26 formed therethrough. Opening 26 is formed through substrate 20 so as to communicate with first side 22 and second side 24.

As illustrated schematically in the embodiment of FIG. 1, one or more strain gages 30 are integrated in substrate 20. More specifically, strain gages 30 are formed in one or more layers of substrate 20, as described below. As such, strain gages 30 can measure strain in substrate 20, for example, before, after, and/or during processing of substrate 20, fabrication of a MEMS device incorporating substrate 20, and/or operation of a MEMS device including substrate 20.

In one embodiment, strain gages 30 are formed in first side 22 of substrate 20. In addition, strain gages 30 are typically formed adjacent to opening 26. For example, one or more strain gages 30 may be formed at an end of opening 26 or along a side of opening 26.

Figure 2:
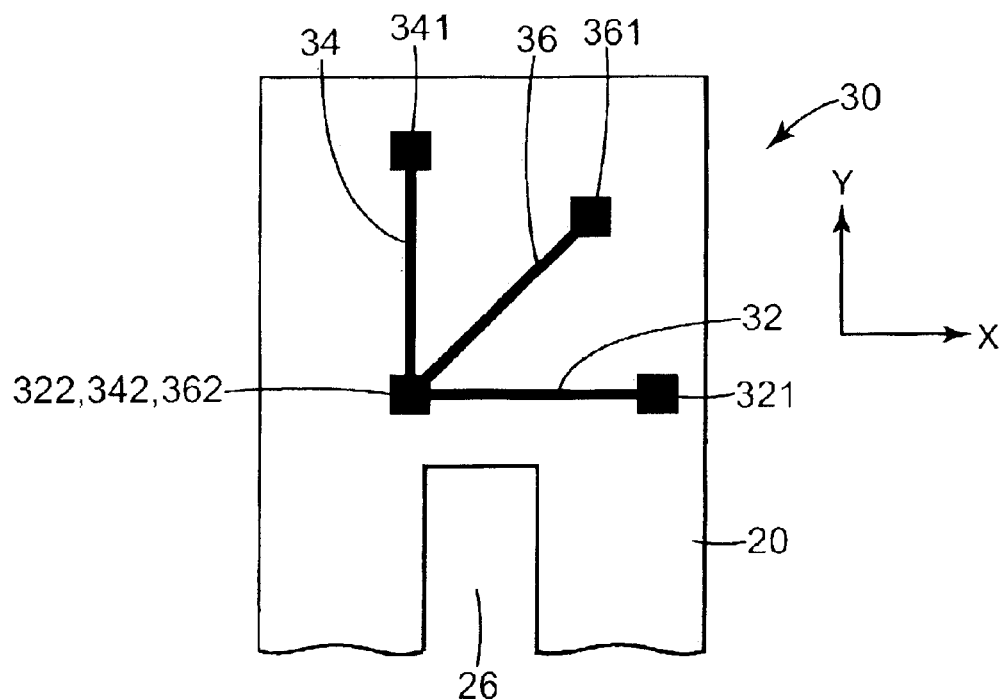
FIG. 2 is a schematic plan view of a portion of the substrate of FIG. 1 illustrating one embodiment of a strain gage integrated in the substrate.

FIG. 2 illustrates one embodiment of a strain gage 30 formed at an end of opening 26 in substrate 20. In one embodiment, strain gage 30 includes one or more elements oriented relative to each other for measuring strain in one or more axes of substrate 20. For example, strain gage 30 includes a first element 32 oriented at a first angle with respect to an axis of substrate 20 for measuring strain in a first axis, a second element 34 oriented at a second angle for measuring strain in a second axis, and a third element 36 oriented at a third angle for measuring strain in a third axis. In one embodiment, second element 34 is oriented substantially perpendicular to first element 32, and third element 36 substantially bisects the angle between first element 32 and second element 34. As such, first element 32, second element 34, and third element 36 form a rosette.

In one illustrative embodiment, first element 32 is oriented at a first angle with respect to an axis of substrate 20 of approximately zero degrees, second element 34 is oriented at a second angle of approximately 90 degrees, and third element 36 is oriented at a third angle of approximately 45 degrees. As such, with respect to FIG. 2, first element 32 is sensitive to strain in an X direction, second element 34 is sensitive to strain in a Y direction, and third element 36 is sensitive to strain in an XY direction.

As described below, strain in substrate 20 causes a change in resistance of strain gage 30 including, more specifically, a change in resistance of first element 32, second element 34, and/or third element 36. To measure the resistance of strain gage 30, first element 32, second element 34, and third element 36 each include first and second terminals 321 and 322, 341 and 342, and 361 and 362, respectively. In one embodiment, second terminals 322, 342, and 362 are combined as one common terminal. Resistance of strain gage 30 can be measured by electrical coupling to the terminals and incorporating strain gage 30 in an electrical circuit, as described below.

Figure 3:
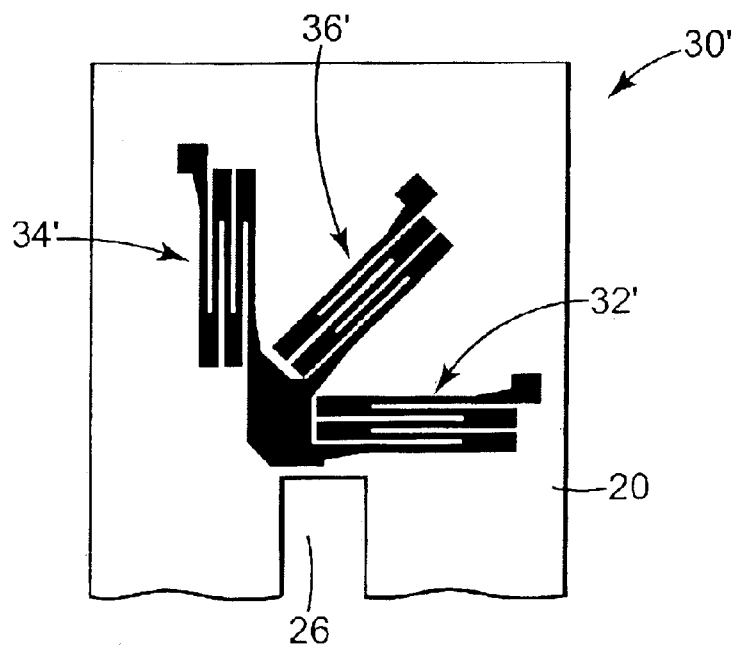
FIG. 3 is a schematic plan view of a portion of the substrate of FIG. 1 illustrating another embodiment of a strain gage integrated in the substrate.

FIG. 3 illustrates another embodiment of a strain gage 30' formed at an end of opening 26 in substrate 20. Similar to strain gage 30, strain gage 30' includes a first element 32', a second element 34', and a third element 36' for measuring strain in X, Y, and XY axes, respectively, of substrate 20. In one illustrative embodiment, first element 32', second element 34', and third element 36', however, each include multiple legs. As such, an effective length of each element of strain gage 30' is increased. Thus, a resistance of each element of strain gage 30' is increased. The relationship of resistance to length for strain gage 30' is expressed as:

$$R = pL/tw$$

where R represents the resistance of the strain gage; p represents the bulk resistivity of the strain gage material; L represents the effective length of the strain gage; t represents the thickness of the strain gage; and w represents the width of the strain gage.

When strain gage 30' is divided into multiple legs, the effective length (L) of strain gage 30' is expressed as:

$$L = lN$$

where *l* represents the length of each leg; and N represents the number of legs. Thus, if necessary, for a given resistance (R) and width (w), strain gage 30' can be divided into N legs each of length (l) when the effective length (L) of strain gage 30' exceeds the size constraints.

Figure 4A:
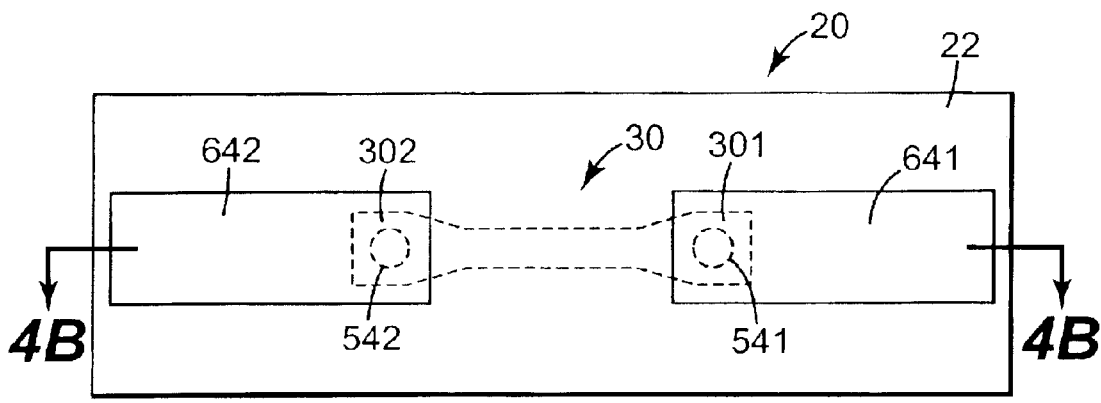
FIGS. 4A and 4B are schematic illustrations of one embodiment of a strain gage integrated in a substrate according to the present invention.
Figure 4B:
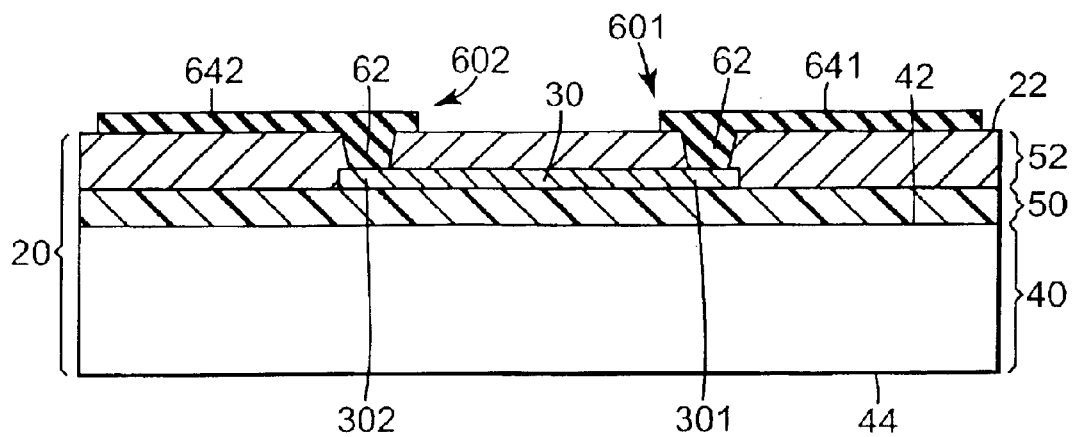

FIGS. 4A and 4B illustrate one embodiment of integrating or forming strain gage 30 in substrate 20. In this embodiment, strain gage 30 is illustrated as including one element having electrical terminals 301 and 302. It is understood, however, that strain gage 30 may include one or more elements oriented relative to each other for measuring strain in one or more axes of substrate 20, as described above. In one embodiment, strain gage 30 is formed in first side 22 of substrate 20.

As illustrated in FIG. 4B, substrate 20 includes a base material 40. As such, strain gage 30 is formed over base material 40 of substrate 20. Base material 40 has a first side 42 and a second side 44 opposite first side 42. Thus, strain gage 30 is formed on first side 42 of base material 40.

In one embodiment, base material 40 is formed of silicon. As such, an insulating or dielectric layer 50 is formed over first side 42 of base material 40. Dielectric layer 50 may include an oxide which is thermally grown on base material 40 or deposited on base material 40 by, for example, chemical vapor deposition (CVD) or plasma enhanced CVD (PECVD). As such, dielectric layer 50 may include, for example, tetraethylorthosilicate (TEOS), silane, silicon dioxide, silicon carbide, silicon nitride, or any other suitable material.

In one embodiment, strain gage 30 is formed on dielectric layer 50. Strain gage 30 is formed by deposition and patterned by photolithography and etching to define strain gage 30, including electrical terminals 301 and 302 of strain gage 30. In one embodiment, strain gage 30 is formed of a polycrystalline silicon (poly silicon) material. In one embodiment, the poly silicon material of strain gage 30 is doped with a dopant material, such as boron or phosphorous, and annealed so as to achieve a desired resistance.

As illustrated in the embodiment of FIG. 4B, an insulating or dielectric material 52 is deposited over strain gage 30 and dielectric layer 50. Dielectric material 52 may include an oxide such as phosphosilicate glass (PSG), tetraethylorthosilicate (TEOS), or any other suitable material.

In one embodiment, conductive paths 601 and 602 are formed to respective electrical terminals 301 and 302 of strain gage 30. To form conductive paths 601 and 602, openings 541 and 542 are formed in dielectric material 52 to respective electrical terminals 301 and 302. As such, conductive paths 601 and 602 are formed by depositing a conductive material 62 in openings 541 and 542 formed in dielectric material 52. In addition, conductive material 62 is deposited over dielectric material 52 to form bond pads 641 and 642 for electrical connection to strain gage 30. Conductive material 62 may include, for example, aluminum, gold, or any other suitable material.

Figure 5:
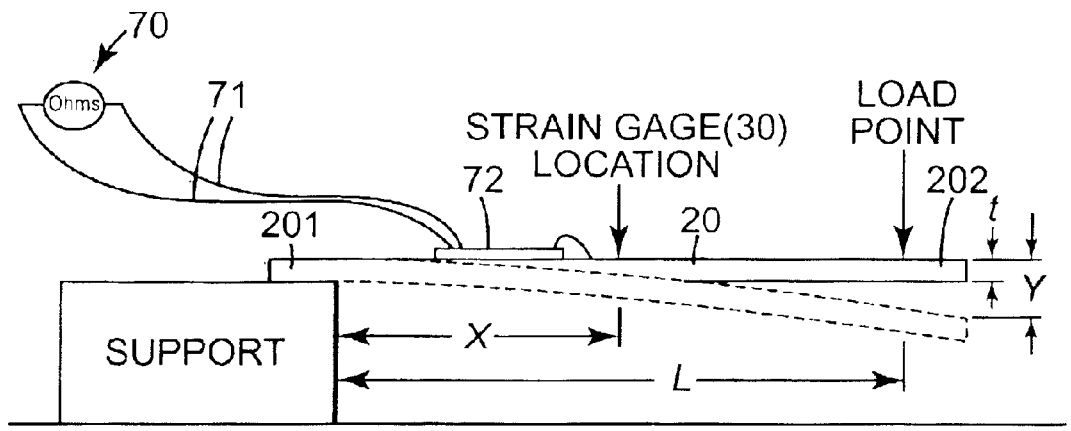
FIG. 5 is a schematic illustration of one embodiment of calibrating a strain gage integrated in a substrate according to the present invention.

FIG. 5 illustrates one embodiment of calibrating strain gage 30 integrated in substrate 20. Strain gage 30 is calibrated by supporting a first end 201 of substrate 20 and subjecting a second end 202 of substrate 20 to a load. As such, second end 202 of substrate 20 is displaced by the load. Thus, strain is created in substrate 20. Strain in substrate 20 is expressed as:

$$\epsilon = 3(L-X)CY/L^3; \ C = t/2$$

where L represents the unsupported distance to the load; X represents the unsupported distance to the strain gage location; t represents the thickness of the substrate; and Y represents the displacement of the substrate. As such, strain in substrate 20 is calculated for varying displacements (Y) of substrate 20.

To calibrate strain gage 30, strain gage 30 is electrically coupled to a resistance measuring device 70, such as an ohmmeter, to measure the resistance of strain gage 30 under the influence of a known load. In one embodiment, strain gage 30 is electrically coupled to resistance measuring device 70 by mounting a flexible electrical circuit 72 on substrate 20, and forming an electrical connection between electrical terminals (for example, electrical terminals 301 and 302 of FIGS. 4A and 4B) of strain gage 30 and flexible electrical circuit 72 and an electrical connection between flexible electrical circuit 72 and resistance measuring device 70. Electrical connection between electrical terminals of strain gage 30 and flexible electrical circuit 72 is formed, for example, by ball bonds. Electrical connection between flexible electrical circuit 72 and resistance measuring device 70 is illustrated, for example, by leads 71.

To establish a sensitivity or gage factor (GF) of strain gage 30, the resistance (R) of strain gage 30 is measured as the displacement (Y) of second end 202 of substrate 20 is varied. As such, the change in resistance (dR/R) of strain gage 30 versus strain ($\epsilon$) in substrate 20 is plotted. Thus, the slope of the linear regression of the data represents the gage factor (GF) of strain gage 30.

Figure 6:
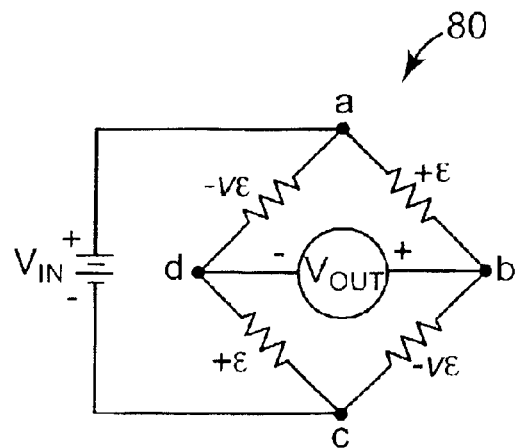
FIG. 6 is a schematic diagram illustrating one embodiment of a strain measuring circuit incorporating a strain gage according to the present invention.

In one embodiment, as illustrated in FIG. 6, to measure strain in substrate 20, strain gage 30 is incorporated in a strain measuring circuit 80. In one embodiment, strain measuring circuit 80 includes a full-bridge Wheatstone bridge circuit. Thus, with application of an input voltage (Vin), an output voltage (Vout) is generated in response to stresses developed in substrate 20. As such, strain ($\epsilon$) in substrate 20 is expressed as:

$$\epsilon = -2Vr/GF[(v+1)-Vr(v-1)];$$

$$Vr=[(Vout/Vin)\text{strained}-(Vout/Vin)\text{unstrained}]$$

where GF represents the gage factor of the strain gage; and v represents Poisson's ratio of the material of the substrate. As such, positive strain represents tensile stresses in substrate 20 and negative strain represents compressive stresses in substrate 20. Strain output of strain measuring circuit 80 is naturally temperature compensated since resistance changes due to temperature are equal for all strain gage elements.

In one embodiment, strain gage 30 is incorporated in strain measuring circuit 80 such that strain gage 30 constitutes one or more of the resistive elements provided between nodes a, b, c, and d of strain measuring circuit 80. One or more strain gages 30 may be incorporated in strain measuring circuit 80 so as to form a quarter-bridge circuit, a half-bridge circuit, or a full-bridge circuit. For example, to form a half-bridge circuit with strain gage 30 including multiple elements as illustrated, for example, in FIG. 2, element 32 of strain gage 30 constitutes the resistive element provided between nodes a and b, and element 34 of strain gage 30 constitutes the resistive element provided between nodes b and c while the resistive elements provided between nodes c and d and nodes d and a are formed by resistors of known values. As such, output of strain measuring circuit 80 can be used to measure strain in X and Y directions.

With opening 26 formed through substrate 20, stress concentrations are generally higher around opening 26 including, more specifically, at the ends of opening 26. Thus, by forming strain gage 30 in substrate 20 adjacent opening 26, strain gage 30 provides a sensitive device for measuring stresses in substrate 20.

Figure 7:
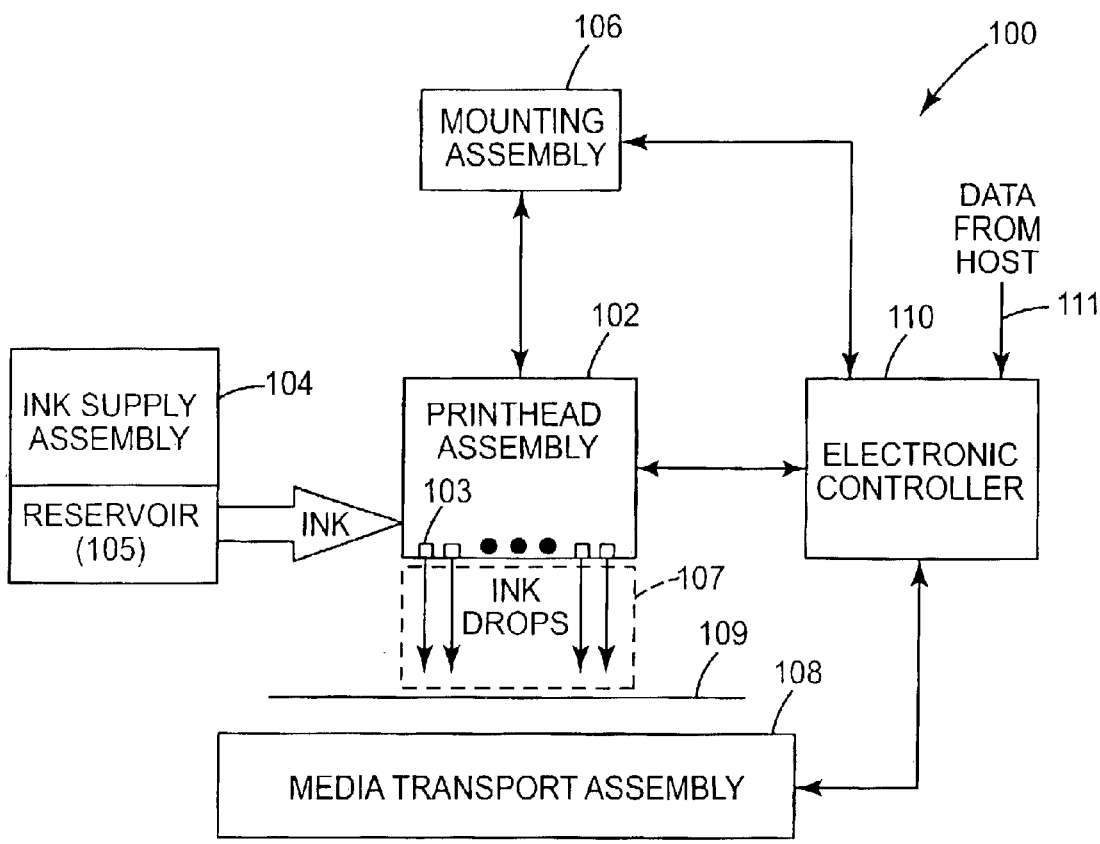
FIG. 7 is a block diagram illustrating one embodiment of a fluid ejection system including a fluid ejection assembly formed with a substrate having an integrated strain gage according to the present invention.

FIG. 7 illustrates one embodiment of an inkjet printing system 100. Inkjet printing system 100 constitutes one embodiment of a fluid ejection system which includes a fluid ejection assembly, such as an inkjet printhead assembly 102, and a fluid supply assembly, such as an ink supply assembly 104. In the illustrated embodiment, inkjet printing system 100 also includes a mounting assembly 106, a media transport assembly 108, and an electronic controller 110.

Inkjet printhead assembly 102, as one embodiment of a fluid ejection assembly, includes one or more printheads or fluid ejection devices which eject drops of ink or fluid through a plurality of orifices or nozzles 103. One or more of the printheads may include a substrate with an integrated strain gage according to the present invention. In one embodiment, the drops are directed toward a medium, such as print medium 109, so as to print onto print medium 109. Print medium 109 is any type of suitable sheet material, such as paper, card stock, transparencies, Mylar, and the like. Typically, nozzles 103 are arranged in one or more columns or arrays such that properly sequenced ejection of ink from nozzles 103 causes, in one embodiment, characters, symbols, and/or other graphics or images to be printed upon print medium 109 as inkjet printhead assembly 102 and print medium 109 are moved relative to each other.

Ink supply assembly 104, as one embodiment of a fluid supply assembly, supplies ink to printhead assembly 102 and includes a reservoir 105 for storing ink. As such, in one embodiment, ink flows from reservoir 105 to inkjet printhead assembly 102. In one embodiment, inkjet printhead assembly 102 and ink supply assembly 104 are housed together in an inkjet or fluidjet cartridge or pen. In another embodiment, ink supply assembly 104 is separate from inkjet printhead assembly 102 and supplies ink to inkjet printhead assembly 102 through an interface connection, such as a supply tube.

Mounting assembly 106 positions inkjet printhead assembly 102 relative to media transport assembly 108 and media transport assembly 108 positions print medium 109 relative to inkjet printhead assembly 102. Thus, a print zone 107 is defined adjacent to nozzles 103 in an area between inkjet printhead assembly 102 and print medium 109. In one embodiment, inkjet printhead assembly 102 is a scanning type printhead assembly and mounting assembly 106 includes a carriage for moving inkjet printhead assembly 102 relative to media transport assembly 108. In another embodiment, inkjet printhead assembly 102 is a non-scanning type printhead assembly and mounting assembly 106 fixes inkjet printhead assembly 102 at a prescribed position relative to media transport assembly 108.

Electronic controller 110 communicates with inkjet printhead assembly 102, mounting assembly 106, and media transport assembly 108. Electronic controller 110 receives data 111 from a host system, such as a computer, and includes memory for temporarily storing data 111. Typically, data 111 is sent to inkjet printing system 100 along an electronic, infrared, optical or other information transfer path. Data 111 represents, for example, a document and/or file to be printed. As such, data 111 forms a print job for inkjet printing system 100 and includes one or more print job commands and/or command parameters.

In one embodiment, electronic controller 110 provides control of inkjet printhead assembly 102 including timing control for ejection of ink drops from nozzles 103. As such, electronic controller 110 defines a pattern of ejected ink drops which form characters, symbols, and/or other graphics or images on print medium 109. Timing control and, therefore, the pattern of ejected ink drops, is determined by the print job commands and/or command parameters. In one embodiment, logic and drive circuitry forming a portion of electronic controller 110 is located on inkjet printhead assembly 102. In another embodiment, logic and drive circuitry is located off inkjet printhead assembly 102.

Figure 8:
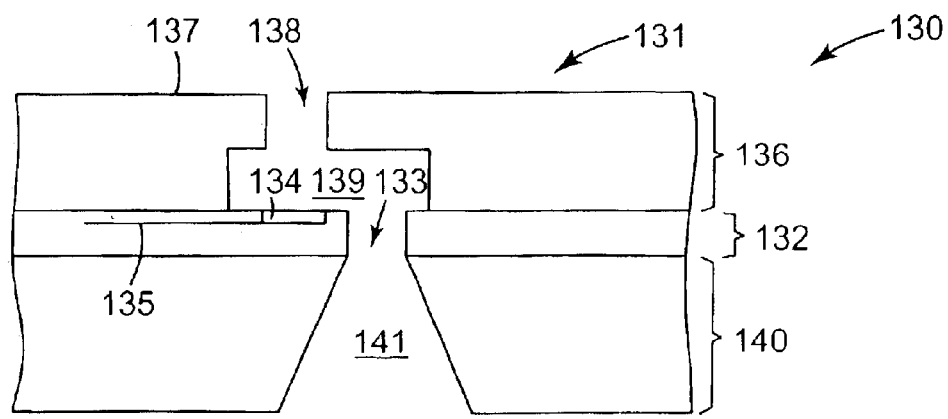
FIG. 8 is a schematic cross-sectional view illustrating one embodiment of a portion of a fluid ejection device.

FIG. 8 illustrates one embodiment of a portion of a fluid ejection device 130 of inkjet printhead assembly 102. Fluid ejection device 130 includes an array of drop ejecting elements 131. Drop ejecting elements 131 are formed on a substrate 140 which has a fluid (or ink) feed slot 141 formed therein. As such, fluid feed slot 141 provides a supply of fluid (or ink) to drop ejecting elements 131. Substrate 140 is formed, for example, of silicon, glass, or a stable polymer.

In one embodiment, each drop ejecting element 131 includes a thin-film structure 132 with a firing resistor 134, and an orifice layer 136. Thin-film structure 132 has a fluid (or ink) feed hole 133 formed therein which communicates with fluid feed slot 141 of substrate 140. Orifice layer 136 has a front face 137 and a nozzle opening 138 formed in front face 137. Orifice layer 136 also has a nozzle chamber 139 formed therein which communicates with nozzle opening 138 and fluid feed hole 133 of thin-film structure 132. Firing resistor 134 is positioned within nozzle chamber 139 and includes leads 135 which electrically couple firing resistor 134 to a drive signal and ground.

Thin-film structure 132 is formed, for example, by one or more passivation or insulation layers of silicon dioxide, silicon carbide, silicon nitride, tetraethylorthosilicate (TEOS), or other suitable material. In one embodiment, thin-film structure 132 also includes a conductive layer which defines firing resistor 134 and leads 135. The conductive layer is formed, for example, by poly-silicon, aluminum, gold, tantalum, tantalum-aluminum, or other metal or metal alloy.

In one embodiment, during operation, fluid flows from fluid feed slot 141 to nozzle chamber 139 via fluid feed hole 133. Nozzle opening 138 is operatively associated with firing resistor 134 such that droplets of fluid are ejected from nozzle chamber 139 through nozzle opening 138 (e.g., normal to the plane of firing resistor 134) and toward a medium upon energization of firing resistor 134.

Example embodiments of fluid ejection device 130 include a thermal printhead, as previously described, a piezoelectric printhead, a flex-tensional printhead, or any other type of fluidjet ejection device known in the art. In one embodiment, fluid ejection device 130 is a fully integrated thermal inkjet printhead.

In one embodiment, substrate 20 represents substrate 140 and thin-film structure 132 of fluid ejection device 130, and opening 26 represents fluid feed slot 141 formed in substrate 140 and fluid feed hole 133 formed in thin-film structure 132. As such, drop ejecting elements 131 of fluid ejection device 130 are formed on first side 42 of base material 40 and strain gage 30 is formed in thin-film structure 132 of fluid ejection device 130. Thus, fluid ejection device 130 represents one example of a MEMS device which can have a substrate with a strain gage integrated therein according to the present invention.

While the above description refers to the inclusion of substrate 20 having opening 26 formed therein in an inkjet printhead assembly, it is understood that substrate 20 having opening 26 formed therein may be incorporated into other fluid ejection systems including non-printing applications or systems, as well as other devices having fluidic channels through a substrate, such as medical devices. Accordingly, the present invention is not limited to printheads, but is applicable to any slotted substrates.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A substrate for a MEMS device, the substrate comprising:

a base material having a first side;

a strain gage formed on the first side of the base material, the strain gage including a poly silicon material;

a dielectric material disposed over the strain gage; and a conductive material in communication with the strain gage through the dielectric material, wherein the substrate is adapted to have at least one opening formed therethrough, wherein the strain gage is adapted to be formed adjacent the at least one opening, and includes a first element oriented at a first angle relative to an edge of the at least one opening, a second element oriented at a second angle substantially perpendicular to the first angle, and a third element oriented at a third angle substantially bisecting the first angle and the second angle.

2. The substrate of claim 1, further comprising:

a dielectric layer formed on the first side of the base material, wherein the strain gage is formed on the first side of the base material over the dielectric layer.

3. The substrate of claim 2, wherein the dielectric layer is one of grown and deposited on the first side of the base material.

4. The substrate of claim 2, wherein the base material includes silicon, and wherein the dielectric layer includes one of tetraethylorthosilicate, silane, silicon dioxide, silicon carbide, and silicon nitride.

5. The substrate of claim 1, wherein the poly silicon material of the strain gage is doped with a dopant material, and wherein the poly silicon material and the dopant material are annealed.

6. The substrate of claim 5, wherein the dopant material includes one of boron and phosphorus.

7. The substrate of claim 1, wherein the dielectric material includes one of phosphosilicate glass and tetraethylorthosilicate.

8. The substrate of claim 1, wherein the dielectric material has at least one opening formed therein to the strain gage, and wherein the conductive material is deposited within the at least one opening in the dielectric material.

9. The substrate of claim 1, wherein the strain gage is adapted to be formed at least one of at an end of the at least one opening through the substrate and along a side of the at least one opening through the substrate.

10. The substrate of claim 1, wherein the MEMS device comprises a fluid rejection device, and wherein the at least one opening through the substrate comprises a fluid passage through the substrate.

11. A method of forming a substrate for a MEMS device, the method comprising:

providing a base material having a first side;

forming a strain gage on the first side of the base material, the strain gage including a poly silicon material;

disposing a dielectric material over the strain gage; and contacting a conductive material with the strain gage through the dielectric material, wherein the substrate is adapted to have at least one opening formed therethrough, wherein the strain gage is adapted to be formed adjacent the at least one opening and include a first element oriented at a first angle relative to an edge of the at least one opening, a second element oriented at a second angle substantially perpendicular to the first angle, and a third element oriented at a third angle substantially bisecting the first angle and the second angle.

12. The method of claim 11, further comprising:

forming a dielectric layer on the first side of the base material, wherein forming the strain gage includes forming the strain gage on the first side of the base material over the dielectric layer.

13. The method of claim 12, wherein forming the dielectric layer includes one of growing and depositing the dielectric layer on the first side of the base material.

14. The method of claim 12, wherein the base material includes silicon, and wherein the dielectric layer includes one of tetraethylorthosilicate, silane, silicon dioxide, silicon carbide, and silicon nitride.

15. The method of claim 11, wherein forming the strain gage includes doping the poly silicon material with a dopant material and annealing the poly silicon material and the dopant material.

16. The method of claim 15, wherein the dopant material includes one of boron and phosphorus.

17. The method of claim 11, wherein the dielectric material includes one of phosphosilicate glass and tetraethylorthosilicate.

18. The method of claim 11, wherein contacting the conductive material with the strain gage includes forming at least one opening in the dielectric material to the strain gage and depositing the conductive material within the at least one opening.

19. The method of claim 11, wherein the strain gage is adapted to be formed at least one of at an end of the at least one opening through the substrate and along a side of the at least one opening through the substrate.

20. The method of claim 11, wherein the MEMS device comprises a fluid ejection device, and wherein the at least one opening through the substrate comprises a fluid passage through the substrate.

21. A method of measuring strain in a substrate of a MEMS device, the substrate having at least one opening formed therethrough, the method comprising:

integrating a poly silicon strain gags in the substrate, including forming the poly silicon strain gage in a layer of the substrate adjacent the least one opening, and orienting a first element of the poly silicon strain gage at a first angle relative to an edge of the at least one opening, orienting a second element of the poly silicon strain gage at a second angle substantially perpendicular to the first angle, and orienting a third element of the poly silicon strain gage at a third angle substantially bisecting the first angle and the second angle;

forming a strain measuring circuit with the poly silicon strain gage;

subjecting the substrate to a load;

measuring a change in resistance of the poly silicon strain gage with the strain measuring circuit in response to the load; and equating the change in resistance of the poly silicon strain gage to strain in the substrate.

22. The method of claim 21, further comprising:

calibrating the poly silicon strain gage, including supporting a first end of the substrate, loading a second end of the substrate opposite the first end, recording a displacement of the second end of the substrate, and measuring a change in resistance of the strain gage in response to the displacement.

23. The method of claim 22, wherein measuring the change in resistance of the strain gage includes electrically coupling the poly silicon strain gage to a resistance measurement device.

24. The method of claim 21, wherein the first element, the second element, and the third element of the poly silicon strain gage each include a first terminal and a second terminal, and wherein forming the strain measuring circuit with the poly silicon strain gage includes electrically coupling the first terminal and the second terminal of each of the first element, the second element, and the third element in a full-bridge circuit.

25. The method of claim 21, wherein measuring the change in resistance of the poly silicon strain gage includes measuring resistance of the poly silicon strain gage at least one of while subjecting the substrate to the load and before and after subjecting the substrate to the load.

26. The method of claim 21, wherein the MEMS device comprises a fluid ejection device, and wherein the at least one opening comprises a fluid passage through the substrate.

27. A fluid ejection device, comprising:

a substrate having at least one opening formed therethrough;

a plurality of drop ejecting elements formed on the substrate; and a strain gage formed in the substrate adjacent the at least one opening, wherein the strain gage includes a first element oriented at a first angle relative to an edge of the at least one opening, a second element oriented at a angel substantially perpendicular to the first angle, and a third element oriented at a third angle substantially bisecting the first angle and the second angle.

28. The device of claim 27, wherein the strain gage includes a poly silicon material.

29. The device of claim 28, wherein the poly silicon material of the strain gage is doped with a dopant material, and wherein the poly silicon material and the dopant material are annealed.

30. The device of claim 27, wherein the substrate includes a dielectric material disposed over the strain gage and a conductive material in communication with the strain gage through the dielectric material.

31. The device of claim 30, wherein the substrate further includes a base material and a dielectric layer formed on a first side of the base material, and wherein the strain gage is formed on the first side of the base material over the dielectric layer.

32. The device of claim 27, wherein the at least one opening comprises a fluid passage through the substrate.

33. The device of claim 27, wherein the fluid ejection device includes an inkjet printhead.

\* \* \* \* \*

UNITED STATES PATENT AND TRADEMARK OFFICE
CERTIFICATE OF CORRECTION

PATENT NO. : 6,739,199 B1
APPLICATION NO. : 10/384887
DATED : May 25, 2004
INVENTOR(S) : Eric Lee Nikkel It is certified that error appears in the above-identified patent and that said Letters Patent is hereby corrected as shown below:

Column 10, Line 31, delete "angel" and insert in lieu thereof -- second angle --.

Signed and Sealed this

Twenty-second Day of May, 2007

JON W. DUDAS
*Director of the United States Patent and Trademark Office*